United States Patent [19]

Mantel

[11] 4,448,538
[45] May 15, 1984

[54] DEVICE FOR REDUCING STATIC AND DYNAMIC PRESSURES IN PIPELINES, PARTICULARLY OF SOLID-BORNE SOUND IN TUBULAR CONDUITS

[76] Inventor: Juval Mantel, Simeonistrasse 19, D-8000 München 19, Fed. Rep. of Germany

[21] Appl. No.: 366,100

[22] Filed: Apr. 6, 1982

[51] Int. Cl.³ ............................................. F01N 1/00
[52] U.S. Cl. ................................... 181/227; 181/247; 181/252; 181/233; 138/26
[58] Field of Search ............... 181/224, 227, 244–248, 181/252, 258, 256, 264; 138/118.1, 121, 126, 145, 149, 155, 26

[56] References Cited

U.S. PATENT DOCUMENTS

| | | | |
|---|---|---|---|
| 650,290 | 5/1900 | Wirt | 181/207 |
| 1,948,211 | 2/1934 | Fritz | 181/207 X |
| 2,495,693 | 1/1950 | Byrd, Jr. et al. | 138/26 X |
| 2,690,901 | 10/1954 | McCormack | 138/121 X |
| 3,076,737 | 2/1963 | Roberts | 138/121 X |
| 3,331,398 | 7/1967 | Goss | 138/26 |
| 3,379,277 | 4/1968 | Willy | 181/246 |
| 4,134,491 | 1/1979 | Turillon et al. | 138/26 X |
| 4,186,775 | 2/1980 | Muroi | 138/26 X |
| 4,299,305 | 11/1981 | Eriksson | 181/230 |
| 4,314,621 | 2/1982 | Hansen | 181/252 X |

FOREIGN PATENT DOCUMENTS

| | | |
|---|---|---|
| 2849926 | 5/1980 | Fed. Rep. of Germany . |
| 2301760 | 9/1976 | France . |

*Primary Examiner*—Benjamin R. Fuller
*Attorney, Agent, or Firm*—Fitzpatrick, Cella, Harper & Scinto

[57] ABSTRACT

In order to reduce static and dynamic pressures in pipelines or tubes and, in particular, in order to attenuate the transmission of sound through tubes in a longitudinal direction it is proposed to provide an outer member and/or an inner member of the tube in such a way as to afford elastic yieldability. Such an elastically yieldable outer member may, for example, be constituted by a low-wave, soft, radially breathing compensator or a corrugated tube. An elastically yieldable inner member may, for example, be constituted by an imperforate breathing body disposed within the tube.

11 Claims, 17 Drawing Figures

4,448,538

DEVICE FOR REDUCING STATIC AND DYNAMIC PRESSURES IN PIPELINES, PARTICULARLY OF SOLID-BORNE SOUND IN TUBULAR CONDUITS

TECHNICAL FIELD OF THE INVENTION

The present invention relates to a device for reducing static and dynamic pressures in spaces like in solar collectors particularly or in pipelines, particularly of solid-borne sound in tubular conduits. In tubes or pipelines which are either empty or filled with water, air, oil, gases, vapors or granular solids or mixtures thereof, the mechanical forces coming into action are affected by temperature fluctuations. Even an empty pipe or tube has to absorb forces caused by variations in temperature which are commonly reduced either by providing a special design or by means of expansion joints.

BRIEF DESCRIPTION OF THE PRIOR ART

If the tube is filled with a medium which has a temperature coefficient differing from that of the material of which the tube is made, additional forces will arise which depend on the difference between the thermal coefficients of expansion of the tube and that of its contents as well as on the temperature fluctuations.

In pipelines, solid-borne sound is transmitted not only through the wall of the tube but also by the stationary or flowing medium present in the tube. For the purpose of preventing the transmission of sound in the longitudinal direction of tubes it is customary to employ expansion joints which are of essentially rigid construction, such expansion joints being only effective, as regards the transmission of sound, if the tubes are empty, that is to say in the case of sound which is predominantly transmitted by the wall of the tube.

OBJECT OF THE INVENTION

In view of the foregoing, it is an object of this invention to provide a device which is adapted to prevent solid-borne sound from being transmitted through the wall of a tube and through the medium present therein.

SUMMARY OF THE INVENTION

According to this invention, said object is attained by the provision of a tube comprising an outer member and an inner member in which said outer member and/or said inner member is of such construction that in operation it is resilient so as to be capable of "breathing" (large change of volume due to small changes in pressure).

Particularly in cases in which such a tube comprises an outer member and an inner member both of which are capable of breathing, the arrangement does not only provide the desired exclusion of solid-borne sound but also provides compensation for the thermal expansion of the tube and for the thermal expansion of the medium which differs from that of the tube.

BRIEF DESCRIPTION OF THE DRAWINGS

The invention and further particulars will be described more specifically hereinafter with reference to preferred embodiments shown in the drawings, in which.

DETAILED DESCRIPTION OF THE PREFERRED EMBODIMENTS OF THE INVENTION

For the purpose of reducing the static and dynamic forces occurring in tubes, such tubes have frequently been provided with so-called compensators or expansion joints adapted to permit axial displacement within certain limits. Such compensators, which may be in the form of corrugated flexible pipes or bellows, make it possible to reduce the transmission of sound through pipelines in cases in which such pipelines are so constructed and arranged that volume surges of the liquid absorbed by the compensator prevent transmission of sound through both the tube and the medium contained therein. For this purpose it is possible to arrange one end of the compensator so as to be rigidly held in position and to support the other end so as to be axially movable and to provide for the radially movable end of the compensator to have no spring rate. However, it is found in practice that even in such compensators of optimum design solid-borne sound is transmitted. In this connection it has been found that such transmission of solid-borne sound results from the fact that the tube and the medium contained therein have an insufficient capability of absorbing the forces which are the source of sound.

This invention now permits optimum sound insulation to be attained also in such cases which frequently occur in practice by providing an outer member and/or an inner member of the tube which is or are resiliently elastic so as to be capable of breathing. Particularly in cases in which both the outer member and the inner member are constructed in this way, optimum insulation of solid-borne sound is obtained and, in addition, it is possible to reduce the static and dynamic forces occurring in the tube.

In FIGS. 1 to 7 showing a variety of embodiments of the invention, the breathing condition capable of attainment is indicated by heavy lines.

Figure 1:
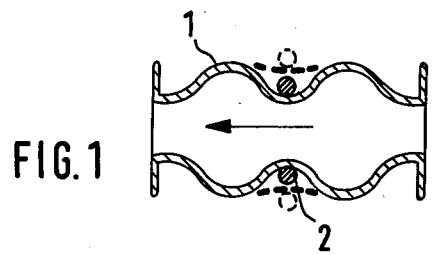
FIGS. 1 and 2 show embodiments of breathing outer members.
Figure 2:
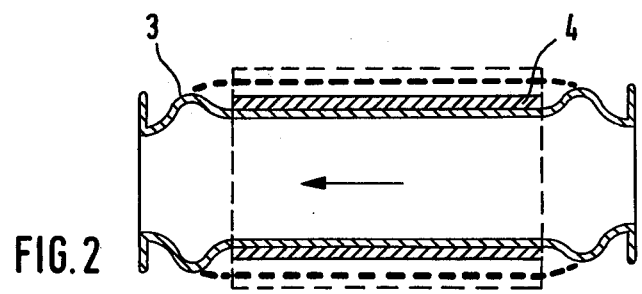

FIGS. 1 and 2 show expansion joints of the corrugated tube type which differ considerably from the conventional expansion joints which are only capable of expansion in an axial direction.

The corrugated-tube compensator 1 shown in FIG. 1 is also resilient in a radial direction such that the volume of the medium contained in the compensator is capable of being changed by medium pressure pulses or volumetric surges. A resilient ring 2 inserted in a valley of compensator 1 is adapted to produce an opposing force acting in the sense of restoring the original position of the corrugated-tube compensator.

In the embodiment shown in FIG. 2, the valley of the corrugated-tube compensator 3 is of extended axial length, said opposing force being provided by a resilient belt 4 disposed in the valley.

Where the corrugated-tube compensator comprises a plurality of valleys, it is, of course, possible to provide a plurality of rings 2 and/or a plurality of belts 4.

It is also possible for the required opposing force to be provided by the inherent elasticity of the corrugated-tube compensator.

The inner member of the compensator may also be designed in a variety of ways.

Figure 3:
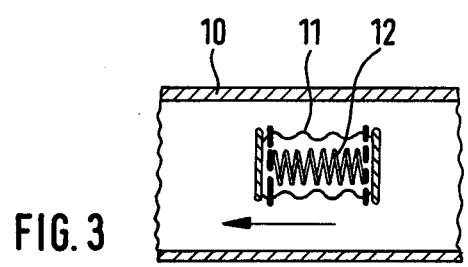
FIGS. 3–7 show embodiments of breathing inner members.

FIG. 3 shows an embodiment in which there is disposed within a tube 10 a compensator 11 which is adapted to be compressed in an axial direction, which, however, is closed to the flowing medium. This embodiment is provided, within compensator 11, with a spring 12; preferably this is a spring made of steel, but it would also be possible to provide a pneumatic or gas-filled spring or the like. It would also be possible to provide compensator 11 with a filling consisting of a rubber-elastic material.

Figure 4:
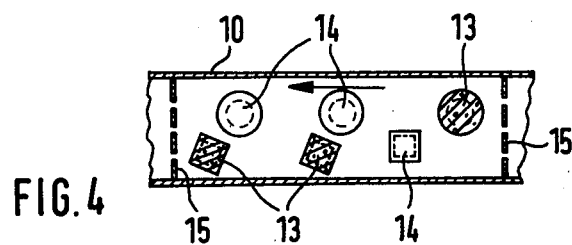

FIG. 4 shows an embodiment in which there are disposed in tube 10 a plurality of closed breathing bodies 13, 14 of different geometrical shape which are retained within a predetermined section of the tube by means of screens 15 permitting the medium to pass through.

Said bodies 13 are made of an imperforate soft-elastic material, e.g. foam rubber or the like having closed pores. The bodies 14 resemble balloons each comprising an imperforate envelope which is filled with a compressible medium such as air or another gas adapted to produce a resilient force. The bodies 13 and 14 are adapted to be compressed by the pressure of the medium flowing through the tube so that additional space is made available for the medium continuing to flow through the compensator. If changes in temperature occur, said medium continues to flow in a static manner whereas flow surges will occur if the medium is transmitting sound. It is these pressure surges, in particular, which will be elastically absorbed by bodies 13, 14. The shape of said bodies is preferably such that the bodies exert a minimum resistance to the flow of the medium.

Figure 5:
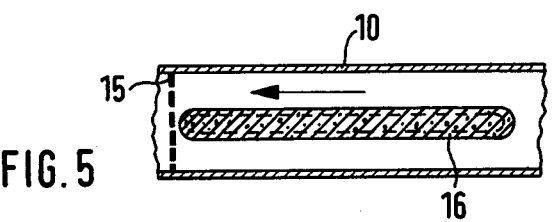

A similar result may be obtained by means of this embodiment shown in FIG. 5 in which there is provided within tube 10 a single body 16 which essentially extends in an axial direction. The elastic body 16 has the shape of a hose and, while also closed to the flowing medium, is elastically compressible. Body 16 may again be made of a foam rubber material or the like having closed pores, but it may also comprise a gas-filled imperforate balloon.

Figure 6:
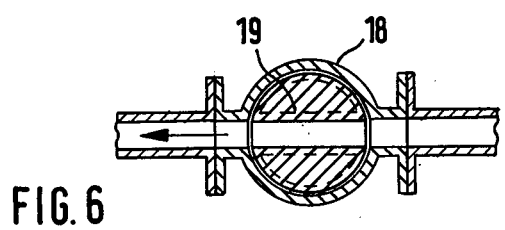

FIG. 6 shows an inner member according to the invention as employed in a spherical compensator 18. While in a conventional spherical compensator the inner member is made of an elastically bendable but only slightly extensible material, the inner member shown in FIG. 6 is formed as an annular body 19 which is made of the same resiliently elastic material as the bodies 13, 14 and 16 described above.

Figure 7:
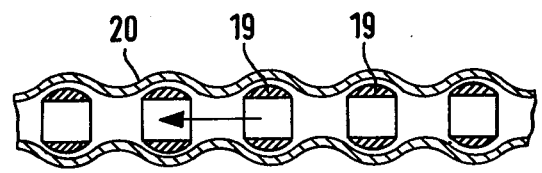

FIG. 7 shows a plurality of annular bodies 19 of the type shown in FIG. 6, said bodies in this case being positioned in the crest portions of a bellows-shaped tube 20 which, while being flexible, is not adapted to breathe. As shown in FIG. 7, a plurality of such annular bodies 19 may be spaced along the axis of a corrugated tube 20.

The various embodiments of inner and outer members described above may be combined in any desired manner. The essential feature is the capability of breathing which affords absorption of static and dynamic forces as well as insulation or attenuation of sound which might be transmitted through the wall of the pipe and through the medium present therein.

Figure 8A:
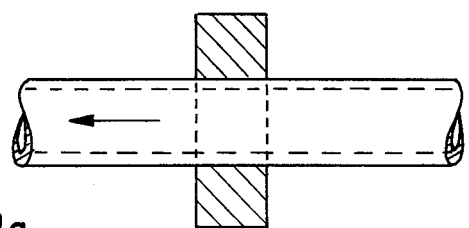
FIGS. 8a–e show additional modifications of the outer member adapted to promote a reduction in pressure and particulary in solid-borne sound.
Figure 8B:
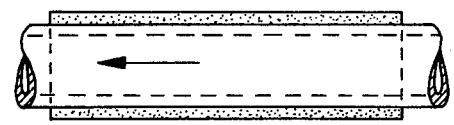
Figure 8C:
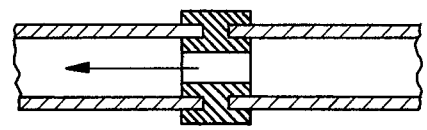
Figure 8D:
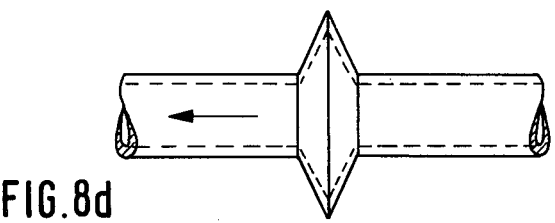
Figure 8E:
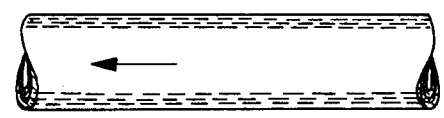
Figure 9A:
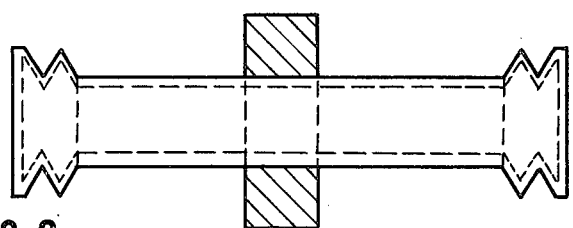
FIGS. 9a–e show additional modifications of the inner member promoting a reduction in pressure and particularly in solid-borne sound.
Figure 9B:
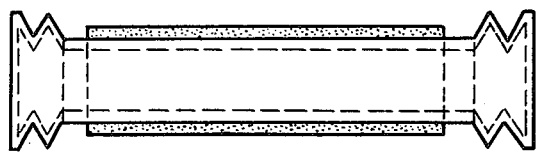
Figure 9C:
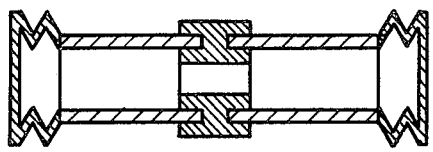
Figure 9D:
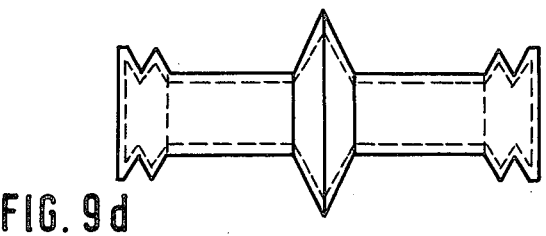
Figure 9E:
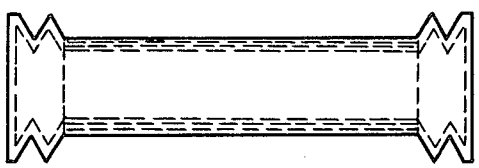

For the purpose of optimizing the attenuation of sound transmitted in a longitudinal direction it is possible to provide both the inner member (FIGS. 9a–9e) and the outer member (FIGS. 8a–8e) with additional features adapted to promote a reduction in undesirable pressures. FIGS. 8a and 9a each show a barrier mass adapted to produce an impedance so as to cause a mismatch. FIGS. 8b and 9b each show a sound deadening layer or coating. In the embodiment of FIG. 2, belt 4 may either itself be made of a barrier material or it may support such a material; belt 4 may at the same time function as a sound deadening layer, or such a layer may be disposed on belt 4 or between belt 4 and compensator 3. As shown in FIGS. 8c and 9c, the tube, particularly its inner member, may be provided with elastic joints made of rubber or the like which are adapted to produce a large damping effect. In the case of the outer member this may be attained, for example, by subdividing belt 4 in an axial direction. For the purpose of increasing sound reflections, it is possible, as shown in FIGS. 8d and 9d, to provide single or multiple folded sections. Finally, it is possible, as shown in FIGS. 8e and 9e, to employ a multi-layer material or a mixture of materials differing in their physical properties such as sound absorption factor, elasticity, dissipation factor and the like; such materials may be employed to increase the propagation losses of the outer or inner member, respectively. These additional features are particularly suitable for incorporation in the outer member, for example the cylindrical belt 4 shown in FIG. 2, and in the inner member, i.e. body 16 or internal compensator 11. For example, a covering of the type shown in FIGS. 9a and 9b provided on an inner member may be adapted either to establish or to prevent a predetermined natural frequency of the inner member.

The inner members, particularly bodies 13, 14 and 16, afford an additional advantage over the outer member in that they cannot be caused by an excessive pressure to be destroyed by bursting. In the case of outer members it is possible at least to a certain extent to provide for protection against destruction by excessive pressure by employing a suitable design, e.g. by providing a belt 4 as shown in FIG. 2.

It will be understood that it is possible to prefabricate tube sections which are provided with an inner member and/or an outer member and which are adapted to be connected by means of flanges to the respective pipelines.

What is claimed is:

1. A device for reducing static and dynamic pressures in pipelines, particularly for preventing solid-borne sound from being transmitted through pipelines, said device comprising a tubular outer member configured to be interposed in a pipeline and a compensator contained within said outer member, said compensator comprising an imperforate resilient breathing body whose volume changes with small changes in externally applied pressure.

2. The device of claim 1, characterized in that said outer member is constituted by a low-wave, soft, radially breathing compensator or a bellows having similar properties.

3. The device of claim 2, characterized in that the capacity of the respective member of breathing is based on the inherent elasticity thereof.

4. The device of claim 2, characterized in that the capability of breathing is provided by a surrounding elastic ring or belt.

5. The device of claim 1, characterized in that said body is constituted by a compensator which is subject to an internally generated spring force and which is adapted to breathe at least in an axial direction.

6. The device of claim 5, characterized in that said body is constituted by a sealed balloon filled with air or a gas.

7. The device of claim 5, characterized in hat said body is constituted by a filling body consisting of foam rubber or the like and having closed pores.

8. The device of claim 7, characterized in that said filling body is provided with an imperforate coating.

9. The device of claim 5, characterized in that said body contains a spring made of steel.

10. The device of claim 4, characterized in that said belt is of subdivided construction.

11. The device of claim 4, characterized in that said belt itself is made of a barrier material.

* * * * *